June 20, 1961 D. M. HAWKINS ET AL 2,989,674
CONTROL APPARATUS FOR CONTROL OF THE TRAVERSE OF A HOT SAW
Filed Jan. 13, 1959 4 Sheets-Sheet 1

WITNESSES
Leon J. Naza
James T. Young

INVENTORS
David M. Hawkins and
Donald E. Abell
BY
Wynnen Diamond
ATTORNEY

Cut
Fig. 4A

Return
Fig. 4B

Fig. 3

2,989,674
Patented June 20, 1961

2,989,674
CONTROL APPARATUS FOR CONTROL OF THE TRAVERSE OF A HOT SAW
David M. Hawkins, Tonawanda, and Donald E. Abell, Lancaster, N.Y., assignors to Westinghouse Electric Corporation, East Pittsburgh, Pa., a corporation of Pennsylvania
Filed Jan. 13, 1959, Ser. No. 786,577
12 Claims. (Cl. 318—39)

This invention relates to the electrical control art and in its specific aspects has particular relation to the control of the traverse of a hot saw which is cutting material, such as an I-beam or a steel pipe.

Apparatus for controlling the traverse of a hot saw in accordance with the teachings of the prior art is typified by Shaw Patent 1,871,750. But in using apparatus such as is disclosed by Shaw for cutting materials at the speeds demanded in modern industry frequent breaking of the teeth of the hot saw has been experienced. This requires not only the replacement of a costly mechanism but also involves loss of time and output while the apparatus is shut down for repair.

It is then an object of this invention to provide a method and apparatus for controlling the operation of a hot saw in the practice and use of which the breaking of the teeth of the saw shall be avoided.

This invention in its broader aspects arises from the realization that the difficulties encountered with prior art apparatus results from the failure of the traverse controlling mechanism to adjust the traverse of the saw adequately to the variations of load imposed on the saw so that the saw moves smoothly through the work. In operation, the teeth of the saw are subjected to different loads which vary sharply as the saw progresses through the material. In a typical situation, an I-beam may be cut. Initially, the saw encounters the flange or flanges of the beam and the load imposed on the teeth is moderate. After the saw has progressed through the flanges it suddenly encounters the web and the load suddenly rises to a high magnitude. The reaction of this sudden increase in the load on prior art regulating apparatus is such that initially the teeth of the saw are withdrawn from contact with the material and thus suddenly the load is reduced to a low magnitude. This sudden decrease in the load causes the saw to return abruptly to engage the material being cut. This abrupt return frequently results in the breaking of the teeth.

It is then a more specific object of this invention to provide apparatus for controlling the traverse of a hot saw and a method for effecting this control in the use and practice of which the application of abrupt changes in the forces on the cutting teeth of the saw shall be precluded.

Another specific object of this invention is to provide novel apparatus and a novel method for controlling the traverse in dependence upon the load on the saw so that the saw moves smoothly and continuously through the work being cut.

An incidental object of this invention is to provide a novel control for a generator.

Another incidental object of this invention is to provide a novel method of controlling the voltage of a generator from a magnetic amplifier.

A still further incidental object of this invention is to provide a novel method of controlling a magnetic amplifier.

A hot saw is driven from an alternating-current motor and the load on the motor is sensed by current transformers in the supply conductors to the motor. The traverse of the saw is controlled by a direct-current motor which is supplied from a generator, the latter controlled in dependence upon the signal derived from the current transformers which measure the load on the hot saw motor.

In accordance with this invention, the generator which supplies the traverse motor is controlled from magnetic amplifier means including essentially output winding means, pattern winding means, and two sets of control winding means. The generator is controlled in dependence upon the current transmitted by the output winding means. Specifically, this current is supplied to the field of the generator in such a way as to control both the magnitude and the polarity of the voltage. The basic level at which the generator is to supply voltage is controlled by the magnitude of the ampere turns of the pattern winding means. This, in turn, controls the basic level at which the traverse motor operates.

The control effected by the pattern winding means is modified by the two control winding means. One of the control winding means is energized from the generator itself and may be selectively connected in two different ways, one way, during the cutting part of an operation, and the other way during the part of the operation during which the saw is being returned to the initial position. During the cutting part of an operation, this control winding means is supplied from the generator through a rectifier. The rectifier is so biased that the supply of current to this control winding means does not start unless the generator voltage exceeds a predetermined magnitude. The control winding means which the generator thus supplies is related to the output winding means in high gain relationship so that when the generator voltage exceeds the biasing voltage by only a few volts (of the order of 3 volts), the current which flows through this control winding means is sufficient to balance the effect of the current through the pattern winding means and, in the absence of other control excitation, the generator voltage remains substantially at a predetermined magnitude. In the saw-return setting of the apparatus, the control winding means just discussed is supplied directly and continuously from the generator and is controlled in dependnce upon the output of the generator independently of its magnitude. In this latter setting of the apparatus, the current supplied to the control winding means may be so related to the current supplied to the pattern winding means that the return of the saw is accomplished in a short time interval.

The other control winding means of the magnetic amplifier means is supplied in dependence upon the load on the hot-saw motor only in the cutting setting of the apparatus from the current transformers coupled to the hot saw motor. The current through this second control winding means counteracts the current through the pattern winding means and once it becomes effective, the generator voltage decreases below the set maximum and the control is taken over by the second control winding means. Thus, during cutting the operation of the traverse is started by the balancing of the ampere turns through the pattern winding means against the ampere turns produced by the voltage of the generator, but once the cutting starts the control is effected by balancing the ampere turns through the pattern winding means against ampere turns dependent upon the load on the saw motor. During the saw return operation, the ampere turns dependent on the potential across the generator is balanced only against the ampere turns through the pattern winding means. The control here described has been found to be highly effective and to preclude any breaking of the teeth of the motor.

The novel features considered characteristic of this invention are disclosed generally above. The invention itself both as to its organization and as to its method of operation, together with additional objects and advantages thereof, will be understood from the following description of a specific embodiment taken in connection with the accompanying drawings, in which.

Figure 1:
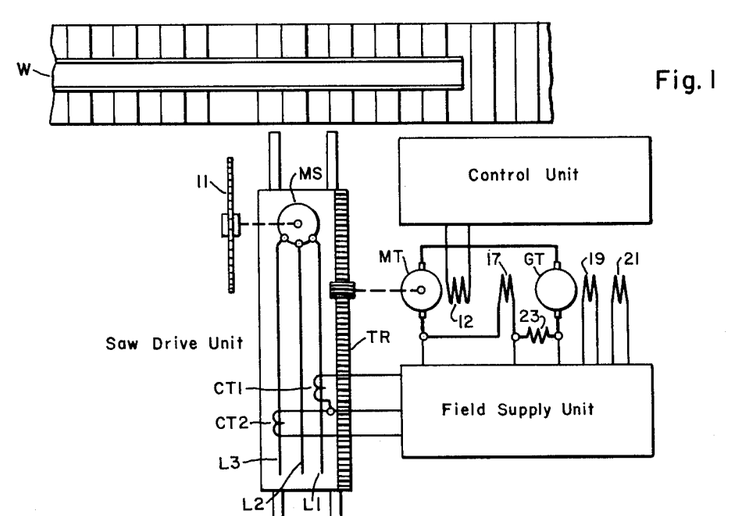
FIGURE 1 is a block diagram of a preferred embodiment of this invention.

The apparatus in accordance with this invention includes a Saw-Drive Unit, a Traverse-Drive Unit, a Control Unit, and a Field Supply Unit. The Saw-Drive Unit includes an alternating-current motor MS which may be energized from conductors L1, L2, L3. These conductors may be energized from a commercial three-phase power supply through the usual disconnects or circuit breakers (not shown). The motor MS drives a rotating hot saw 11 and is mounted on a traverse TR which advances the saw to a position where it may cut the work W, for example, a pipe or an I-beam, and returns the saw from the cutting position on the completion of a cutting operation. The load on the saw is sensed by current transformers CT1 and CT2 which are coupled to the conductors L1 and L2. The transformers CT1 and CT2 supply a full-wave rectifier RX1 in the Field Supply Unit. The rectifier RX1 energizes a positive conductor ALP and a negative conductor ALN.

The Traverse-Drive Unit includes a motor MT which drives the traverse TR of the Saw-Drive Unit and which is itself energized from a generator GT in dependence upon the voltage of the generator. The motor has a shunt field winding 12 supplied from a suitable direct current supply. The motor MT may be shorted through a braking resistor 13 and the back contacts M$b$ of a contactor M actuable in the Control Unit (this contactor not shown), in the standby condition of the apparatus. The motor MT may also be provided with a brake 15 which is releasable electromagnetically on the closing of contacts BR$a$ and BR$b$ of a relay (not shown) in the Control Unit.

Figure 2A:
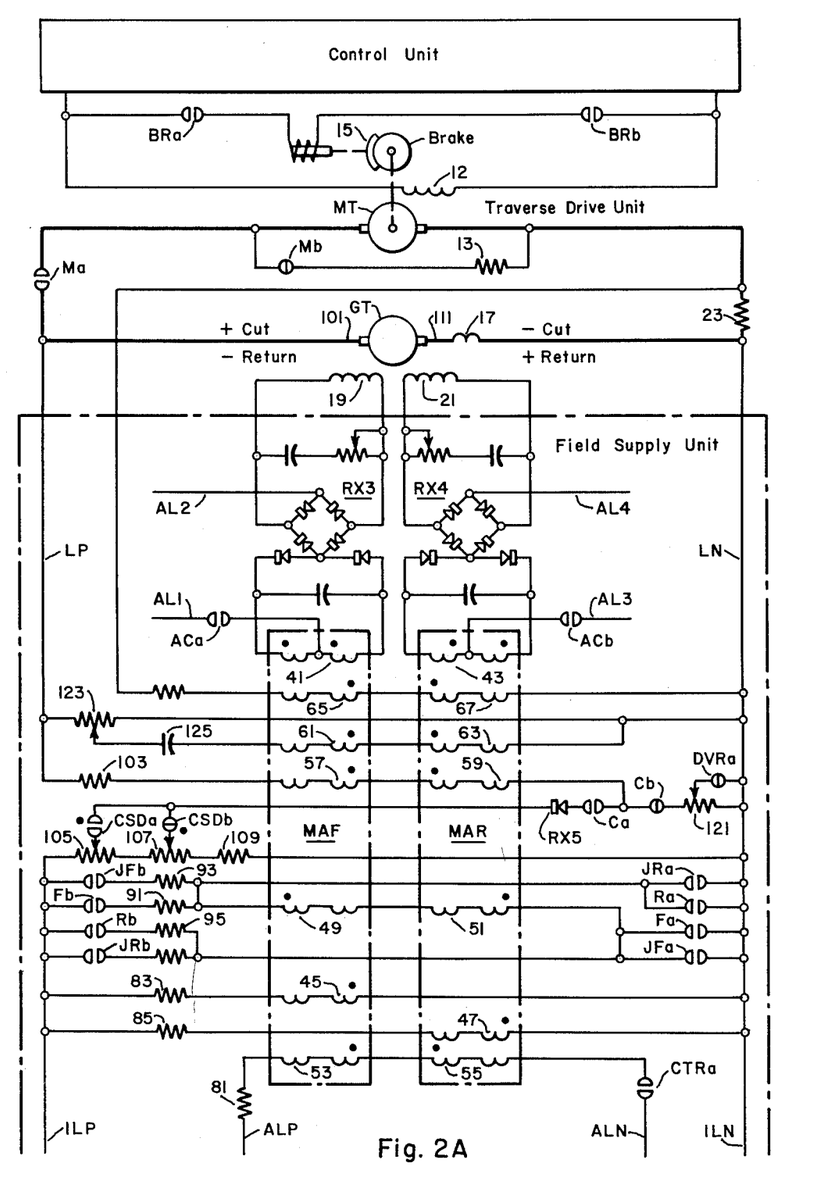
FIGS. 2A and 2B together are schematics showing the essential features of the embodiment shown in FIG. 1.

The generator GT is provided with a series field winding 17 and a pair of shunt field windings 19 and 21. Current through one of the shunt windings 19 produces a potential across the generator driving the motor MT so that the traverse TR advances in the cutting direction and current through the other shunt winding 21 produces potential across the generator such as to cause the motor MT to return the saw. The polarities of the generator for cut and return are shown in FIG. 2A. The generator GT is connected to the motor MT through its series field winding 17, a low resistor 23 serving to produce a potential drop for effecting droop control of the generator characteristic when necessary, and contacts M$a$ of the contactor M.

The Control Unit is shown only as a block since its specific form does not concern the important features of the invention disclosed herein. This Control Unit includes the relays, contactors, and limit switches (only contacts shown in the Traverse Drive Unit and Field Supply Unit) for controlling the operation of the motor MS, the generator GT and the motor MT in the manner desired either to jog the traverse TR to control it semiautomatically or to control it automatically. The Control Unit includes a contactor referred to here as M having contacts M$a$ and M$b$, a relay referred to as BR having contacts BR$a$ and BR$b$, a relay referred to as F, the actuation of which causes forward traverse of the Saw-Drive Unit in the cutting direction, a relay referred to as R, actuation of which causes return movement of the Saw-Drive Unit and corresponding forward and return jog relays referred to as JR and JF. The Control Unit also includes a relay referred to as C which is actuable to start a cutting operation and, a relay referred to as CTR which is actuable on actuation of the relay C and causes conductors ALP and ALN to be connected in controlling operation. There is also a slowdown relay referred to as CSD which reduces the speed of traverse TR before it starts to cut. This relay CSD is energized in the standby condition of the apparatus and may be deenergized to set the apparatus for slower traverse on the actuation of one of a plurality of limit switches which are set in dependence upon the cross sectional dimensions of the material being cut. Another relay referred to as DVR which, in unactuated condition, suppresses any residual field of the generator GT during stand-by. Further, there is a master relay referred to as MR, the actuation of which energizes a contactor AC in the Field Supply Unit which causes the Field Supply Unit to be energized.

The relays R, F, JF and JR each have front contacts R$a$, R$b$, F$a$, F$b$, JF$a$, JF$b$ and JR$a$, JR$b$ in addition to the contacts in the Control Unit for interlocking and other control purposes. The relay C has a front contact C$a$ and a back contact C$b$. The relay CSD has a front contact CSD$a$ and a back contact CSD$b$ in addition to other contacts. The relay DVR has a back contact DVR$a$ in addition to others. The relay CTR has a front contact CTR$a$ and a back contact CTR$b$ in addition to others. The contactor AC, front contacts AC$a$ and AC$b$ and the master relay MR a front contact MR$a$.

The Field Supply Unit includes a magnetic amplifier MAF for energizing the forward field winding 19 of the generator GT and a magnetic amplifier MAR for energizing the return field winding 21 of the generator GT. Each of these amplifiers MAF and MAR has an output winding 41, 43, a bias winding 45, 47 a pattern winding 49, 51, a current control winding 53, 55, a voltage control winding 57, 59, a damping winding 61, 63, and a droop winding 65, 67.

Figure 4A:
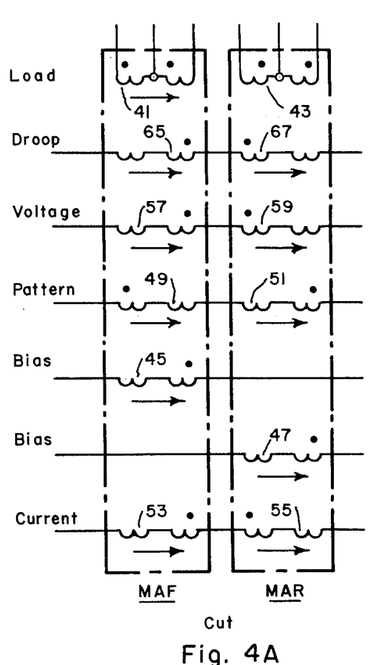
FIGS. 4A and 4B are diagrammatic views showing the current flow through the winding means of the magnetic amplifiers of FIGS. 2 and 3 during the cutting part and the saw returning part of an operation.
Figure 4B:
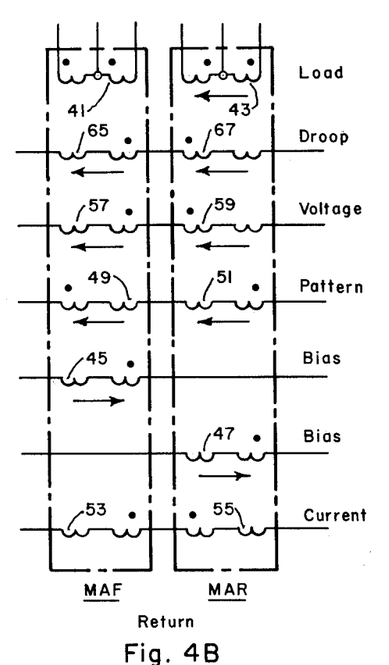

The relationship between the output winding 41 or 43 and the other windings of each of the amplifiers MAF and MAR is indicated in the drawing by a dot at one end or the other of each winding. The flow of positive current (holes or positive charges) through a control winding from the end at which the dot appears to the other end causes an increase in the output current (through the corresponding output winding 41 or 43) of the magnetic amplifier MAF or MAR. The flow of positive current from the end not labeled by a dot to the end labeled by a dot causes a decrease in the output of the amplifier. Thus, the flow of positive current from left to right (referred to FIGS. 2A or 4B) through the current control winding 53 of amplifier MAF would cause a decrease in the output of this amplifier, while the flow of current from left to right through the current control winding 55 of MAR would cause an increase in the output of this amplifier.

The magnetic amplifiers MAF and MAR are supplied with alternating current from conductors AL1 and AL2 and AL3 and AL4 respectively, which may be derived from a pair of the polyphase conductors L1, L2 and L3 through suitable transformers (not shown). Bias and pattern potential for the amplifiers MAF and MAR is derived from the conductors LP and LN of a constant potential supply energized from the conductors L1, L2 and L3 through a suitable rectifier RX2 and transformers (not shown). Conductors ALP and ALN, supply the current control to windings 53 and 55. The generator GT supplies the voltage windings 57, 59, the damping windings 61, 63 and the droop windings 65, 67.

Figure 3:
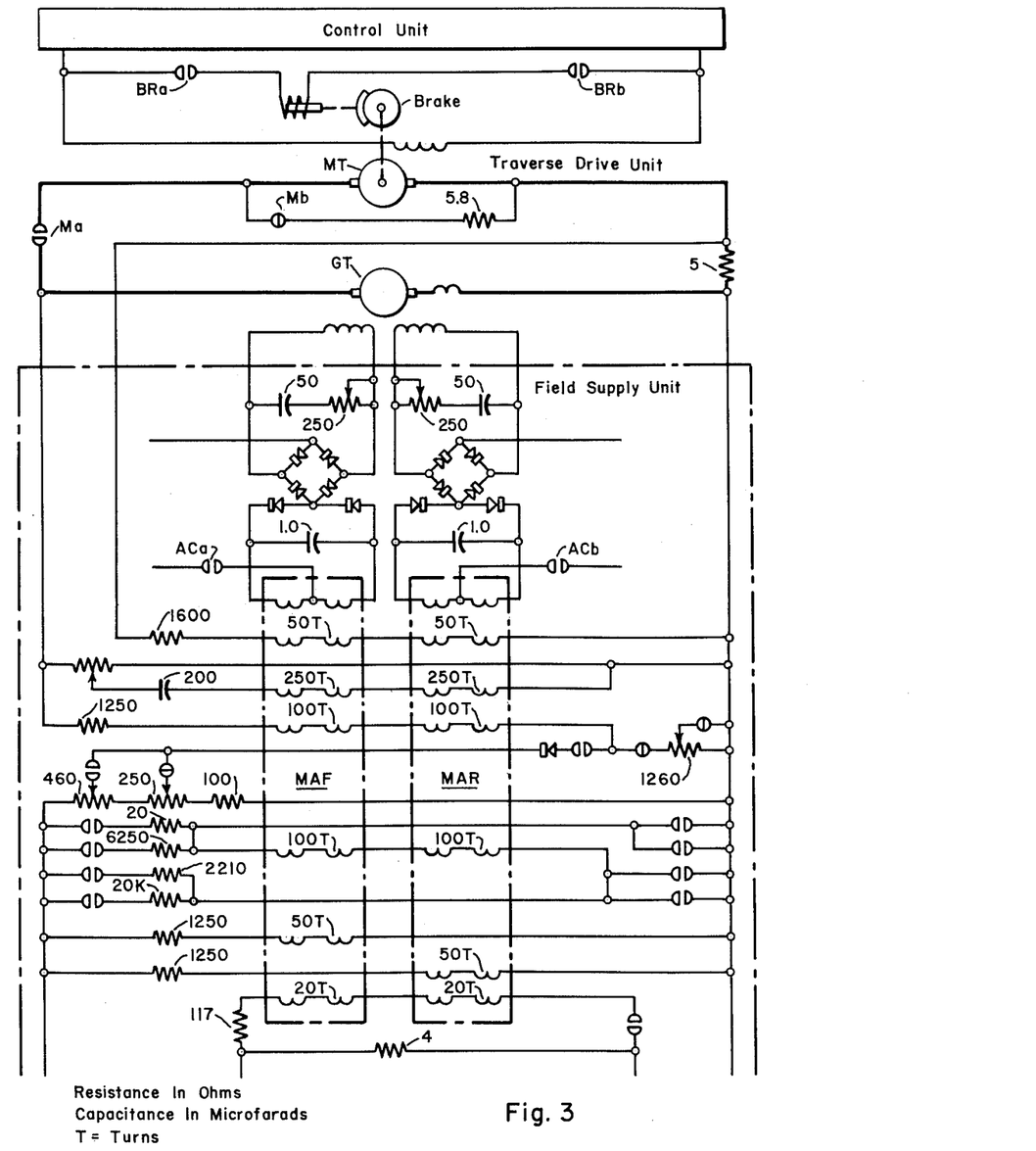
FIG. 3 is a schematic similar to FIG. 2, but including the magnitudes of the components included in apparatus as disclosed which has been constructed and found to operate satisfactorily.

The forward field winding 19 of the generator GT is adapted to be supplied from conductors AL1 and AL2 through front contact ACa and rectifier system RX3 connected to produce the usual self-saturating effect in the amplifier MAF. The rectifier RX3 is so connected to the output winding 41 of MAF that the output current flows from right to left (referred to FIG. 3) through the output winding and through the forward field winding 19 of the generator GT. The return field winding 21 of the generator GT is supplied from conductors AL3 and AL4 through front contact ACb and through a rectifier system RX4 adapted to produce the self-saturating effect. The flow of current through the output winding 43 and through the field winding 21 is from left to right.

When the apparatus is not set for cutting, the output of rectifier RX1 is shorted by back contact CTRb and no current flows through windings 53 and 55. During a cutting operation, the current control windings 53 and 55 of MAF and MAR are supplied in series from conductors ALP and ALN, through a current limiting resistor 81 and front contact CTRa. The polarity of the supply is such that an increase in the potential between ALP and ALN produced by increased load on saw motor MS reduces the output of MAF and increases the output of MAR. This, in turn, would reduce the speed of the traverse motor MT.

The bias windings 45 and 47 of MAF and MAR are, respectively, supplied from conductors LP and LN through resistors 83 and 85. The ampere turns through 45 and 47 is the same for all settings of the apparatus and is of such polarity as to tend to reduce the output of the respective amplifiers MAF and MAR.

In the forward setting or the jog-forward setting of the apparatus, the pattern windings 49 and 51 are supplied in series from LP and LN through front contacts Fa and Fb or JFa and JFb respectively, and associated resistors 91 and 93. The supply is such that the ampere turns through the pattern winding 49 of MAF tends to increase the output of this amplifier and the supply of this current through the pattern winding 51 of MAR tends to decrease the output of this amplifier. The current flow through the pattern winding is reversed when the apparatus is set for return or jog-return in which case JRa and JRb and/or Ra and Rb are actuated. The resistor 95 in series with the contacts Ra and Rb is substantially smaller than the resistor 91 in series with the contacts Fa and Fb and the pattern windings are supplied with substantially higher current in the return setting than in the cut setting. In the cut setting of the apparatus before the apparatus is set for cut slow down the voltage control windings 57 and 59 are supplied in a circuit extending from the then positive terminal 101 of the generator through a resistor 103, the windings 57 and 59 in series, the contacts Ca, a rectifier RX5, the normally closed front contacts CSDa, a pair of variable resistors 105 and 107 and a fixed resistor 109, the series field winding 17 of the generator to the negative terminal 111 of the generator. The variable resistors 105 and 107 are supplied from conductors 1LP and 1LN and impress a blocking potential on the rectifier RX5, such that no current is conducted through the voltage control windings 57 and 59 unless the generator potential exceeds the potential derivable from the variable resistor 105 and the constant potential source of 1LP and 1LN. When the voltage control windings 57 and 59 do conduct current, the generator voltage potential LP and LN exceed the constant potential 1LP and 1LN, and the polarity of the ampere turns is such as to counteract the ampere turns of the respective corresponding pattern windings 49 and 51. Thus, the voltage control windings 57 and 59 limit the voltage of the generator GT in dependence upon the setting of the variable resistor 105, but these windings 57 and 59 are effective only so long as the generator is substantially at its maximum voltage. Below this maximum voltage, the pattern windings 49 and 51 are not affected by the windings 57 and 59. When the apparatus is set for slowdown by the deenergization of the relay CSD, the back contact CSDb closes and the front contact CSDa opens. The maximum voltage of the generator GT between lead LP and LN is thus reduced in accordance with the setting of resistor 107 and the motor MT may be correspondingly slowed down.

In the return setting of the apparatus, the generator GT is connected to supply the voltage control windings 57 and 59 in a circuit extending from the now positive terminal 111 of the generator through a variable resistor 121, the back contact Cb of relay C, the voltage control windings 59 and 57 in series, resistor 103 to the now negative terminal 101 of the generator. During an operation DVR is actuated and the whole resistor 121 is in series with the windings 57 and 59 at the end of an operation. When the generator GT is to be deenergized, the back contact DVRa is closed and there is a low resistance across the generator suppressing any residual voltage. For damping purposes, a variable resistor 123 is connected across the generator GT. The damping windings 61 and 63 are connected in series across this resistor 123 through a capacitor 125. Sharp variations of the generator potential are thus suppressed. The droop windings 65 and 67 of the amplifiers MAF and MAR are connected across the resistor 23 in series between the generator GT and motor MT through a resistor 127. The connection is such that a droop in the characteristic is produced if the generator voltage tends to rise excessively.

In the standby condition of the apparatus preparatory to a cutting operation, the circuit breakers and disconnects (not shown) of the apparatus are closed, energizing conductors L1, L2, L3 and the power supplies for the Control Unit, the conductors 1LP and 1LN of the Field Supply Unit and of the Traverse Drive Unit. The motor MS is thus energized and drives the saw 11. Potential appears between conductors ALP and ALN, but this potential is relatively small since the saw is not under load.

Figure 2B:
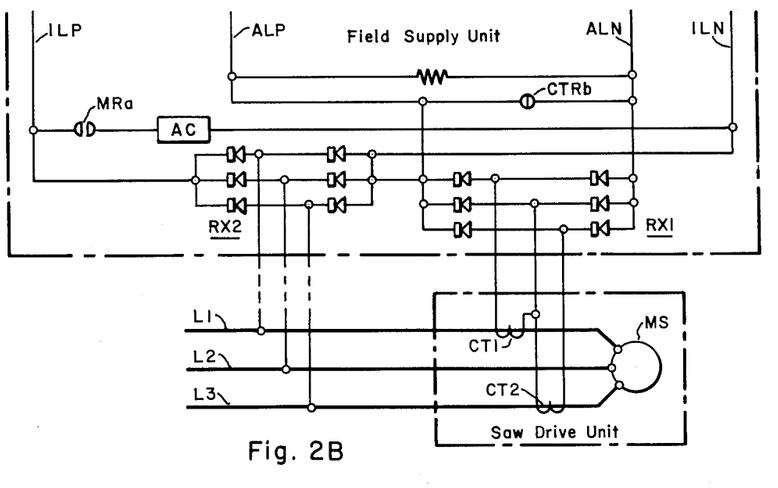
Figure 5:
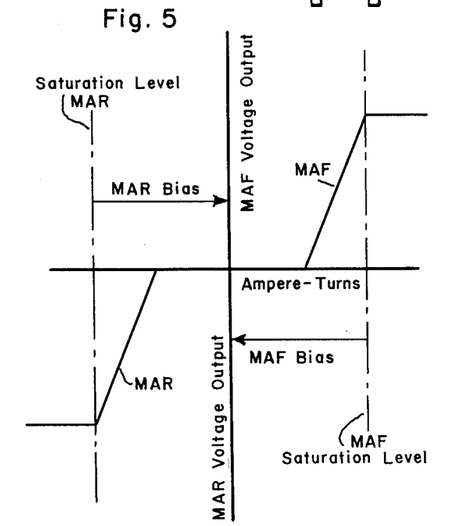
FIG. 5 is a graph showing a feasible setting of the magnetic amplifiers in the use of the apparatus shown in FIGS. 2 and 3.

In the Control Unit, contactor MR is actuated when motor MS is energized closing contact MRa and actuating contactor AC. Contacts ACa and ACb are then closed energizing the output windings 41 and 43 of the magnetic amplifiers MAF and MAR. When MR is actuated contactor M is also actuated, closing contact Ma and connecting the motor MT to the generator GT. Since there is potential between 1LP and 1LN the bias winding 45 and 47 of both amplifiers are energized. The biases are so set that in the absence of other excitation, both of the amplifiers MAF and MAR are just at cutoff. This is illustrated in FIG. 5, in which output in volts is plotted vertically and bias in ampere turns horizontally. The output for MAF is plotted vertically upwardly and the output for MAR vertically downwardly. The bias, pattern, voltage droop and current ampere turns for MAF is plotted positive to the right; the homologous ampere turns for MAR is plotted positive to the left. The bias impressed is negative relative to the magnetic amplifier saturation level to correspond to FIG. 2. The characteristic curves for the two amplifiers are plotted in heavy lines. It is seen that for both amplifiers the output increases as the bias becomes less negative. This is in accordance with FIG. 2.

As the apparatus is now set, relays C, F, R, JR, JF, CTR and DVR are still unactuated. No current is then supplied to the current control windings 53 and 55 or the pattern windings 41 and 51. The voltage windings 57 and 59 are connected across the generator GT through Cb and variable resistor and DVRa and there is no voltage across the generator so that the motor MT is deenergized.

In addition, the contacts BRb and BRa are opened and the brake is applied to the motor MT. Mb is open so that the dynamic braking is disconnected from the motor MT.

Preparatory to a cutting operation, the apparatus is set so that there will be slow-down of the traverse TR to correspond to the cross dimensions of the work W when the saw is about to contact the work. Initially in this setting relay CSD is actuated so that the higher bias voltage is adapted to be impressed through resistor 105 on the rectifier RX5 in series with Ca. This condition of CSD during standby is indicated by dots at CSDa and CSDb.

Now assume that a cutting operation is to be carried out. Under such circumstances, the Control Unit is set for cutting. Relays F, C and CTR are then actuated in the proper sequence. In addition, relay BR is actuated to lift the brake from motor MT. Relay DVR is also actuated so that all of the variable resistor 121 is connected across the generator GT.

The actuation of relay F causes current to be supplied through the pattern windings 49 and 51. The polarity of this current is such that the bias of amplifier MAF is counteracted while ampere turns are added to the bias of MAR. The output of amplifier MAF then tends to increase (FIG. 5) increasing the current flow through the forward field winding 19 and the forward output potential of the generator GT.

The short circuit across conductors ALP and ALN is opened and these conductors are connected to supply current to the current windings 53 and 55. The effect of the resulting ampere turns is in this case in the same sense as the bias for amplifier MAF and in the opposite sense to the bias on amplifier MAR, but the potential between ALP and ALN is small, so that this current has substantially no effect.

By the actuation of relay C, the voltage windings 57 and 59 are connected through the rectifier RX5 and through front contact CSDa to the variable resistor 105. Initially, the potential of generator GT is low and the potential of the variable resistor 105 blocks the flow of current through the voltage windings 57 and 59. Initially, then, the generator voltage increases because of the ampere turns in the pattern windings 49 and 51, and the motor MT is accelerated to a predetermined speed.

Eventually, the generator voltage reaches a point at which the bias voltage from the variable resistor 105 is exceeded and current flows through the voltage control windings 57 and 59 of the amplifiers MAF and MAR. The ampere turns through the voltage control windings 57 and 59 of each amplifier MAF and MAR tends to counteract the ampere turns through the corresponding pattern windings 49 and 51. The effect is to maintain the generator voltage at a magnitude just greater than the bias from 105. Since the voltage control windings 57 and 59 are high gain windings, the excess of the generator voltage over the bias voltage 105 is small, of the order of two or three volts. The flow of current through the damping windings 61 and 63 and the droop windings 65 and 67 is such as to oppose the ampere turns through the pattern windings 49 and 51 respectively and to effect the desired compensation.

The generator GT is now set at its maximum forward potential and the motor MT is rotating at its maximum forward speed MT. The saw 11 is then advanced towards the work W. When the saw reaches a point near the work, a limit switch (not shown) is opened and relay CSD is deenergized and the bias on the rectifier is transferred from the higher voltage resistor 105 to the lower voltage resistor 107. This reduces the generator voltage, reducing the speed of the motor MT preparatory to the starting of the actual cutting.

As the cutting now progresses, the load on the motor MS increases increasing the potential between conductors ALP and ALN. This has the effect of increasing the current through the current windings 53 and 55 of the amplifiers. The increase in current through MAF tends to counteract the ampere turns of the pattern winding 49, reducing the potential of the generator GT. Since the potential of the generator exceeds the bias potential from the variable resistor 107 only by a few volts, the supply of current through the voltage windings 57 and 59 is interrupted for a small increase in the load on the saw motor MS. The output of amplifier MAF is then determined by the relationship between the ampere turns of the current winding 53 and the ampere turns of the pattern winding 49. A similar situation arises in amplifier MAR but in this case the ampere turns through the current winding 55 tends to increase the output of amplifier MAR, counteracting the tendency to decrease of the pattern winding 51. The resulting effect may be that the reverse field winding 21 of generator GT is supplied oppositely to the forward winding 19 and the voltage of the generator GT is closely controlled by the push-pull effect of the amplifiers MAF and MAR on the field windings 19 and 21. The speed of the motor MT is then closely controlled. As the load on the motor MS increases, the speed of the motor is correspondingly decreased to maintain the force on the saw 11 uniform independently of the load. If an I-beam is being cut and the saw teeth pass from the flanges to the web of the I-beam, the sharp increase in the load on the motor MS results in a sharp decrease of the speed of the motor MT so that the saw teeth are not excessively stressed. In the practice of this invention, it has actually been found that the amplifiers MAF and MAR controlled as disclosed operate to maintain a constant load on the motor MS and on the saw blade independently of the section which is being cut or of any changes in the hardness of the material being cut. The control disclosed also has the effect of maintaining a constant relationship or constant ratio between the speed of the cutting and the area of the material being cut so that the maximum productivity is achieved efficiently.

The cutting part of the operation continues until it has been completed. At this point, the traverse TR may operate limit switches (not shown) which cause relays F, C, CTR, BR and DVR to be deenergized. The generator GT is now deenergized, the residual field being suppressed effectively by the closing of the back contact DVRa. The motor MT is then also stopped. The saw motor MS remains energized.

If the apparatus is set for automatic operation, the actuation of the limit switches now causes relays R, BR and DVR to be actuated. The closing of contacts Ra and Rb now causes current to be supplied to the pattern windings 49 and 51 in a direction opposite to the current flow during the cutting operation. The direction of this current flow is now such that the ampere turns through the pattern winding 51 of the amplifier MAR tends to increase the output of this amplifier and the ampere turns through the pattern winding 49 of MAF tends to decrease the output. Since the ampere turns through the bias winding 45 and 47 remains unchanged, the effect on the generator GT is opposite to that produced during cutting. The generator voltage with a polarity corresponding to return now increases in dependence upon the ampere turns through the pattern winding 51. Because the resistor 95 now in series with the pattern windings 49 and 51 are smaller than the resistor 91 during cutting, the ampere turns through the pattern windings 49 and 51 are substantially higher and the tendency of these ampere windings is to set the generator voltage to a substantially higher magnitude than during cutting. This tendency is continuously counteracted by the flow of current from the generator through the voltage control windings 57 and 59. This current is such as to reduce the output of the amplifier MAR and increase the output of the amplifier MAF. But the potential of the generator GT remains substantially higher than during cutting. The potential on the motor MT then remains higher and the saw is returned in a relatively short time to the initial position so that another cutting operation may be carried out.

The apparatus disclosed herein has substantial advantages over prior art apparatus. At the start of a cutting operation, the speed of the saw traverse reaches its maximum magnitude in a relatively short time interval, thus avoiding costly delay in operation. Once the maximum speed is reached, it is maintained substantially constant because of the action of the voltage windings 57 and 59 of the amplifiers until the cutting starts. The cutting part of the operation is also at the most efficient speed and the return operation is at a substantially higher speed than maximum.

Figure 6:
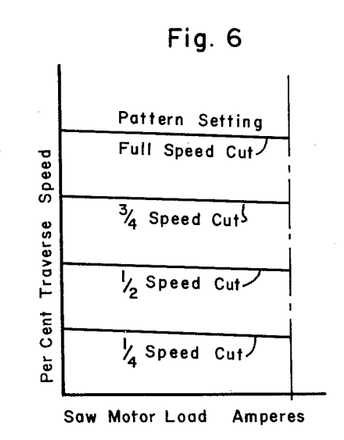
FIG. 6 is a graph illustrating the traverse-feed speed-saw-load characteristic of a saw controlled in accordance with this invention.

The relationship between the traverse speed and the load on the motor MS during cutting (CSD deenergized) is shown in FIG. 6. Traverse speed is plotted vertically and the load on motor MS horizontally. The speed decreases as the load increases. The maximum speed may be set at different magnitudes by setting resistor 107.

While a preferred embodiment of this invention has been disclosed herein, many modifications thereof are feasible. This invention then is not to be restricted except insofar as is necessitated by the spirit of the prior art.

We claim as our invention:

1. Apparatus for controlling the traverse of a hot saw during a cutting operation during which said saw cuts work comprising first motor means connected to said saw for driving said saw in cutting relationship with said work, second motor means connected to said first motor means for causing the traverse of said first motor means and said saw, generator means connected to said second motor means to energize said second motor means, saturable reactor means, having output winding means, pattern winding means, first control winding means, and second control winding means, means connecting said output winding means to said generator to control the output of said generator in accordance with the output of said output winding means, means connected to said pattern winding means for transmitting current of a predetermined magnitude through said pattern winding means, means connecting said generator to said first control winding means for transmitting current through said first winding means when said generator has a potential exceeding a predetermined magnitude to balance the effect of said current through said pattern winding means on said output winding means, and means connecting said first motor means to said second control winding means to transmit current through said second control winding means dependent on the loading on said first motor means, said last-named current having a polarity opposing the effect of the current transmitted through said pattern winding means.

2. Apparatus for controlling the traverse of a hot saw during a cutting operation during which said saw cuts work comprising first motor means connected to said saw for driving said saw in cutting relationship with said work, second motor means connected to said first motor means for causing the traverse of said first motor means and said saw, generator means connected to said second motor means to energize said second motor means, saturable reactor means, having output winding means, control winding means, and presetting winding means for presetting the current through said output winding means in the absence of a signal through said control winding means, means connecting said output winding means to said generator to control the output of said generator in accordance with the output of said output winding means, means connected to said presetting winding means for transmitting current of a predetermined magnitude through said presetting winding means, and means connecting said first motor means to said control winding means to transmit current through said control winding means dependent on the loading on said first motor means, said last-named current having a polarity opposing the effect of the current transmitted through said presetting winding means.

3. Apparatus for controlling the traverse of a hot saw during a cutting operation during which said saw cuts work comprising first motor means connected to said saw for driving said saw in cutting relationship with said work, second motor means connected to said first motor means for causing the traverse of said first motor means and said saw, generator means connected to said second motor means to energize said second motor means, saturable reactor means having output winding means, control winding means, and presetting winding means for presetting the current through said output winding means in the absence of a signal through said control winding means, means connecting said output winding means to said generator to control the output of said generator in accordance with the output of said output winding means, means connected to said presetting winding means for transmitting current of a predetermined magnitude through said presetting winding means, means connecting said generator to said presetting winding means to limit the effect of said current through said presetting winding means on said output winding means in dependence upon the output potential of said generator, and means connecting said first motor means to said control winding means to transmit current through said control winding means dependent on the loading on said first motor means, said last-named current having a polarity opposing the effect of the current transmitted through said presetting winding means.

4. Apparatus for controlling the traverse of a hot-saw during a cutting operation during which said saw cuts work comprising first motor means connected to said saw for driving said saw in cutting relationship with said work, second motor means connected to said first motor means for causing the traverse of said first motor means and said saw, generator means connected to said second motor means to energize said second motor means, saturable reactor means, having output winding means, control winding means, and presetting winding means for presetting the current through said output winding means in the absence of current through said control winding means, means connecting said output winding means to said generator to control the output of said generator in accordance with the output of said output winding means, means connected to said presetting winding means for transmitting current of a predetermined magnitude through said presetting winding means, means connecting said generator to said presetting winding means to limit the effect of said current through said presetting winding means on said output winding means in dependence upon the output potential of said generator so that the potential of said generator in the absence of current through said control winding means is no greater than a predetermined magnitude, and means connecting said first motor means to said control winding means to transmit current through said control winding means dependent on the loading on said first motor means, said last-named current having a polarity opposing the effect of the current transmitted through said presetting winding means.

5. Apparatus for controlling the traverse of a hot saw during a cutting operation during which said saw cuts work comprising first motor means connected to said saw for driving said saw in cutting relationship with said work, second motor means connected to said first motor means for causing the traverse of said first motor means and said saw, generator means connected to said second motor means to energize said second motor means, saturable reactor means having output winding means, pattern winding means, first control winding means, and second control winding means, said first control winding means being of the high-gain type so that a relatively small change in the ampere turns through said first control winding means produces a large change in the current through said output winding means, means connecting said output winding means to said generator to control the output of said generator in accordance with the output of said output winding means, means connected to said pattern winding means for transmitting ampere turns of a predetermined magnitude through said pattern winding means, means connecting said generator to said first control winding means for transmitting ampere turns through said first winding means when said generator has a potential exceeding a predetermined magnitude to balance the effect of said ampere turns through said pattern winding means on said output winding means, and means connecting said first motor means to said second control winding means to transmit ampere turns through said second control winding means dependent on the loading on said first motor means, said last-named ampere turns having a polarity opposing the effect of the ampere turns through said pattern winding means.

6. Power supply apparatus including a generator having a first field winding and a second field winding, a first magnetic amplifier, a second magnetic amplifier, each said amplifier having output winding means, pattern winding means, first control winding means, and second control winding means, means connecting said output winding means of said first amplifier to said first field winding so that an increase in current through said last-named output winding means increases the potential output of said generator of one polarity and decreases the potential output of said generator of the opposite polarity, means connecting said output winding means of said second amplifier to said second field winding so that an increase in current through said last-named output winding means increases the potential output of said generator of said opposite polarity and decreases the potential output of said generator of said one polarity, first means connected to both said pattern winding means for selectively setting said current through both said pattern winding means in a first setting so as to increase said potential output of said generator of said one polarity and to decrease said potential output of said generator of said opposite polarity or in a second setting so as to increase said potential output of said opposite polarity and to decrease said potential output of said one polarity, second means connecting said generator to said first control winding means of both said amplifiers selectively in a first setting when said first means is in said first setting or in a second setting when said first means is in said second setting, the current through both said first winding means counteracting the current through both said pattern winding means only when said voltage of said one polarity exceeds a predetermined magnitude with said first and second means in said first settings and the current through both said first winding means counteracting the current through both said pattern winding means for all magnitudes of said voltage of said opposite polarity with said first and second means in said second settings, and third means connected to said second control winding means of both said amplifiers for supplying ampere turns to said second winding means only in said first settings of said first and second means, said last-named ampere turns opposing the effect of the ampere turns through said pattern winding means of both said amplifiers in said first setting of said first means.

7. Power supply apparatus including a generator having a first field winding and a second field winding, a first magnetic amplifier, a second magnetic amplifier, each said amplifier having output winding means, pattern winding means, first control winding means, and second control winding means, said first control winding means each of said amplifiers being related in high-gain relationship with said output winding means of the corresponding amplifier so that a small change in the ampere turns through one of said first control winding means produces a large change in the output potential of the corresponding output winding means, means connecting said output winding means of said first amplifier to said first field winding so that an increase in the output potential of said last-named output winding means increases the potential output of said generator of one polarity and decreases the potential output of said generator of the opposite polarity, means connecting said output winding means of said second amplifier to said second field winding so that an increase in the output potential of said last-named output winding means increases the potential output of said generator of said opposite polarity and decreases the potential output of said generator of said one polarity, first means connected to both said pattern winding means for selectively setting ampere turns through both said pattern winding means in a first setting so as to increase said potential output of said generator of said one polarity and to decrease said potential output of said generator of said opposite polarity or in a second setting so as to increase said potential output of said opposite polarity and to decrease said potential output of said one polarity, second means connecting said generator to said first control winding means of both said amplifiers selectively in a first setting when said first means is in said first setting or in a second setting when said first means is in said second setting, the ampere turns through both said first winding means counteracting the ampere turns through both said pattern winding means only when said voltage of said one polarity exceeds a predetermined magnitude with said first and second means in said first settings and the ampere turns through both said first winding means counteracting the ampere turns respectively through both said pattern winding means for all magnitudes of said voltage of said opposite polarity with said first and second means in said second settings, and third means connected to said second control winding means of both said amplifiers for supplying ampere turns to said second winding means only in said first settings of said first and second means, said last-named ampere turns opposing the effect of the ampere turns through said pattern winding means of both said amplifiers in said first setting of said first means.

8. Power supply apparatus including a generator having a first field winding and a second field winding, a first magnetic amplifier, a second magnetic amplifier, each said amplifier having output winding means, pattern winding means, first control winding means, and second control winding means, means connecting said output winding means of said first amplifier to said first field winding so that an increase in the output of said last-named output winding means increases the potential output of said generator of one polarity and decreases the potential output of said generator of the opposite polarity, means connecting said output winding means of said second amplifier to said second field winding so that an increase in the output of said last-named output winding means increases the potential output of said generator of said opposite polarity and decreases the potential output of said generator of said one polarity, first means connected to both said pattern winding means for selectively setting said ampere turns through both said pattern winding means in a first setting so as to increase said output of said generator of said one polarity and to decrease said output of said generator of opposite polarity or in a second setting so as to increase said potential output of said opposite polarity and to decrease said potential output of said one polarity, said ampere turns in said first setting being substantially lower than said ampere turns in said second setting, second means connecting said generator to said first control winding means of both said amplifiers selectively in a first setting when said first means is in said first setting or in a second setting when said first means is in said second setting, the ampere turns through both said first winding means counteracting the ampere turns through both said pattern winding means only when said output of said one polarity exceeds a predetermined magnitude with said first and second means in said first setting and the ampere turns through both said first winding means counteracting the ampere turns through both said pattern winding means for all magnitudes of said voltage of said opposite polarity with said first and second means in said second settings, and third means connected to said second control winding means of both said amplifiers for supplying ampere turns to said second winding means only in said first settings of said first and second means, said last-named ampere turns opposing the effect of the ampere turns through said pattern winding means of both said amplifiers in said first setting of said first means.

9. Apparatus for controlling a generator including magnetic amplifier means having output winding means connected to said generator to set the output potential of said generator in accordance with the output of said magnetic amplifier means, pattern winding means having ampere turns of a predetermined magnitude to set said generator output potential at a predetermined magnitude in the absence of control excitation of said amplifier means, first control winding means and second control winding means, means connected to said generator and to said first control winding means for supplying ampere turns from said generator through said first control winding means to counteract said ampere turns through said pattern winding means only when said output potential of said generator exceeds a predetermined magnitude, and means connected to said second control winding means for supplying ampere turns through said second control winding means to counteract the ampere turns through said pattern winding means and control said output potential of said generator when the output potential of said generator is less than said predetermined magnitude.

10. Control apparatus including a magnetic amplifier having an output winding controlling the potential of a load, a pattern winding, a first control winding and a second control winding, means connected to said pattern winding for supplying ampere turns of a predetermined magnitude through said pattern winding to set the output of said output winding at a predetermined magnitude in the absence of control excitation of said amplifier, means connected to said first control winding and to said load for supplying ampere turns through said first control winding to counteract said ampere turns through said pattern winding only when said potential of said load exceeds a predetermined magnitude, and means connected to said second control winding for supplying control ampere turns through said second control winding to counteract said ampere turns through said pattern winding in dependence upon said last-named control ampere turns thus to control the potential of said load when said last-named potential is less than said magnitude.

11. Apparatus for controlling the traverse of a hot saw during a cutting operation during which said saw cuts work comprising first motor means connected to said saw for driving said saw in cutting relationship with said work, second motor means connected to said first motor means for causing the traverse of said first motor means and said saw, generator means connected to said second motor means to energize said second motor means, saturable reactor means, having output winding means, pattern winding means, first control winding means, and second control winding means, means connecting said output winding means to said generator to control the output of said generator in accordance with the output of said output winding means, means connected to said pattern winding means for transmitting current of a predetermined magnitude through said pattern winding means, means connecting said generator to said first control winding means for transmitting current through said first winding means when said generator has a potential exceeding a predetermined magnitude to balance the effect of said current through said pattern winding means on said output winding means, means connected to said transmitting means and responsive to the traverse position of said saw when said saw is near cutting position for setting said transmitting means to transmit current through said first winding means to balance the effect of said current through said pattern winding means when said generator has a potential of another predetermined magnitude smaller than said first-named magnitude, and means connecting said first motor means to said second control winding means to transmit current through said second control winding means dependent on the loading on said first motor means, said last-named current having a polarity opposing the effect of the current transmitted through said pattern winding means.

12. Apparatus for controlling the traverse of a hot saw during a cutting operation during which said saw cuts work comprising first motor means connected to said saw for driving said saw in cutting relationship with said work, second motor means connected to said first motor means for causing the traverse of said first motor means and said saw, generator means connected to said second motor means to energize said second motor means, saturable reactor means, having output winding means, pattern winding means, first control winding means, and second control winding means, means connecting said output winding means to said generator to control the output of said generator in accordance with the output of said output winding means, means connected to said pattern winding means for transmitting current of a predetermined magnitude through said pattern winding means, means connecting said generator to said first control winding means for transmitting current through said first winding means when said generator has a potential exceeding a predetermined magnitude to balance the effect of said current through said pattern winding means on said output winding means, means connected to said transmitting means and responsive to the traverse position of said saw when said saw is near cutting position for setting said transmitting means to transmit current through said first winding means to balance the effect of said current through said pattern winding means when said generator has a potential of another predetermined magnitude smaller than said first-named magnitude, and means connecting said first motor means to said second control winding means to transmit current through said second control winding means dependent on the loading on said first motor means, said last-named current having a polarity opposing the effect of the current transmitted through said pattern winding means, said first winding means being high gain winding means so that a small change in the ampere turns through said first winding means produces a large change in the potential output of said generator.

References Cited in the file of this patent
UNITED STATES PATENTS

| | | |
|---|---|---|
| 1,871,750 | Shaw | Aug. 16, 1932 |
| 2,340,060 | King | Jan. 25, 1944 |
| 2,349,618 | Graybrook | May 23, 1944 |
| 2,362,569 | Lososco | Nov. 14, 1944 |
| 2,725,519 | Malick et al. | Nov. 29, 1955 |
| 2,727,694 | Helmick | Dec. 20, 1955 |
| 2,798,170 | Carlisle | July 2, 1957 |